United States Patent [19]

Critchley et al.

[11] Patent Number: 4,474,518
[45] Date of Patent: Oct. 2, 1984

[54] SHIELDED CELLS HAVING MANIPULATORS COMPRISING A MASTER ARM AND A SLAVE ARM

[75] Inventors: Richard J. Critchley, Chorley, England; Samuel R. Oldham, Albuquerque, N. Mex.

[73] Assignee: British Nuclear Fuels Limited, Warrington, England

[21] Appl. No.: 378,803

[22] Filed: May 17, 1982

[30] Foreign Application Priority Data

May 18, 1981 [GB] United Kingdom ............... 8115157
Sep. 22, 1981 [GB] United Kingdom ............... 8128675

[51] Int. Cl.³ .............................................. B25J 3/00
[52] U.S. Cl. ....................................... 414/8; 414/221; 29/402.08; 29/426.5
[58] Field of Search ........................................ 414/1-8, 414/217, 221; 29/402.08, 426.5, 213 R

[56] References Cited

U.S. PATENT DOCUMENTS 3,475,808 11/1969 Woolsey ........................... 29/402.08

FOREIGN PATENT DOCUMENTS 1248526 11/1960 France ..................................... 414/8
1341489 12/1973 United Kingdom .................... 414/1

Primary Examiner—Robert J. Spar
Assistant Examiner—Terrance L. Siemens
Attorney, Agent, or Firm—William R. Hinds

[57] ABSTRACT

The slave arm (15) in a sealed containment (12 or 210) is arranged to be replaceable by forward displacement by a new arm (115 or 215). The new arm is preceded by an intermediate sealing body (101 or 201) sealed on the new arm by a flexible bag (103 or 203) which is removable into the sealed containment once the new arm is located in the sealed containment. Preferably the sealed containment (12) is spaced from a shield wall (10) to provide an interspace (13) accessible to a protected operator and the linking part (16) of the manipulator has a demountable coupling (24) in the interspace so that the new arm can be inserted from the interspace.

4 Claims, 11 Drawing Figures

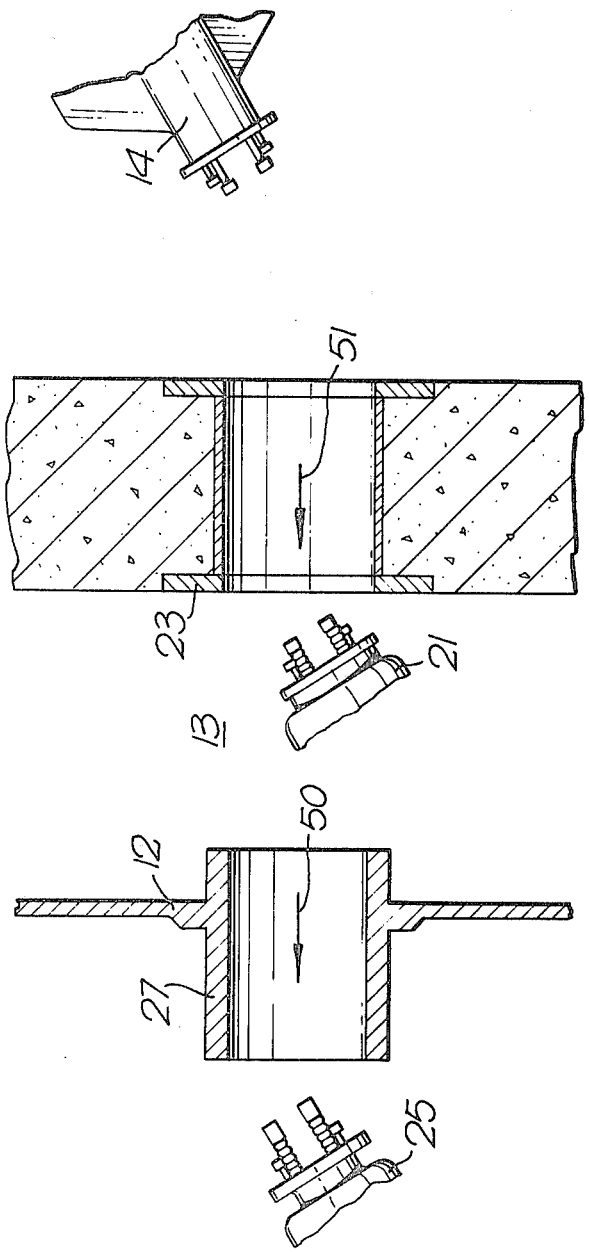

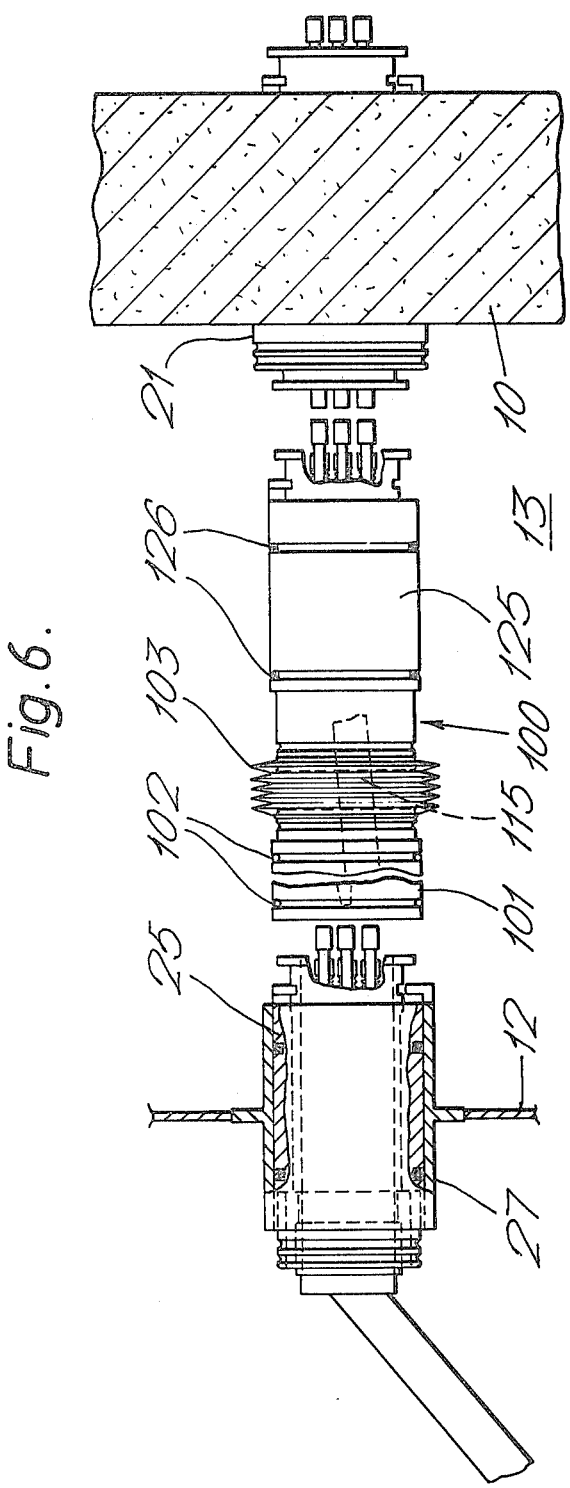

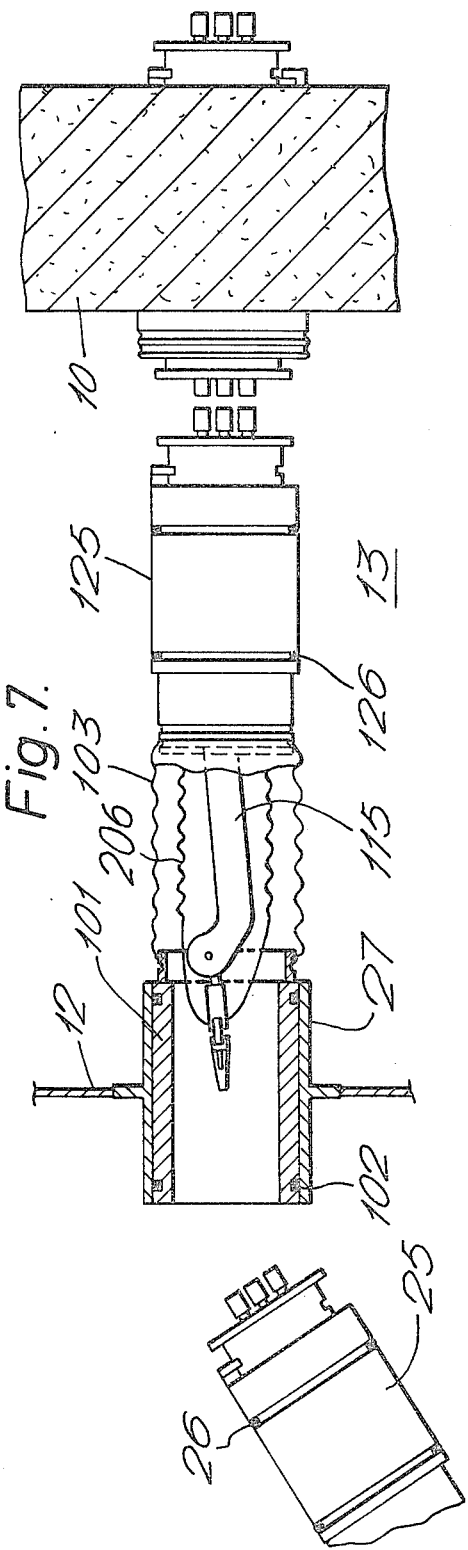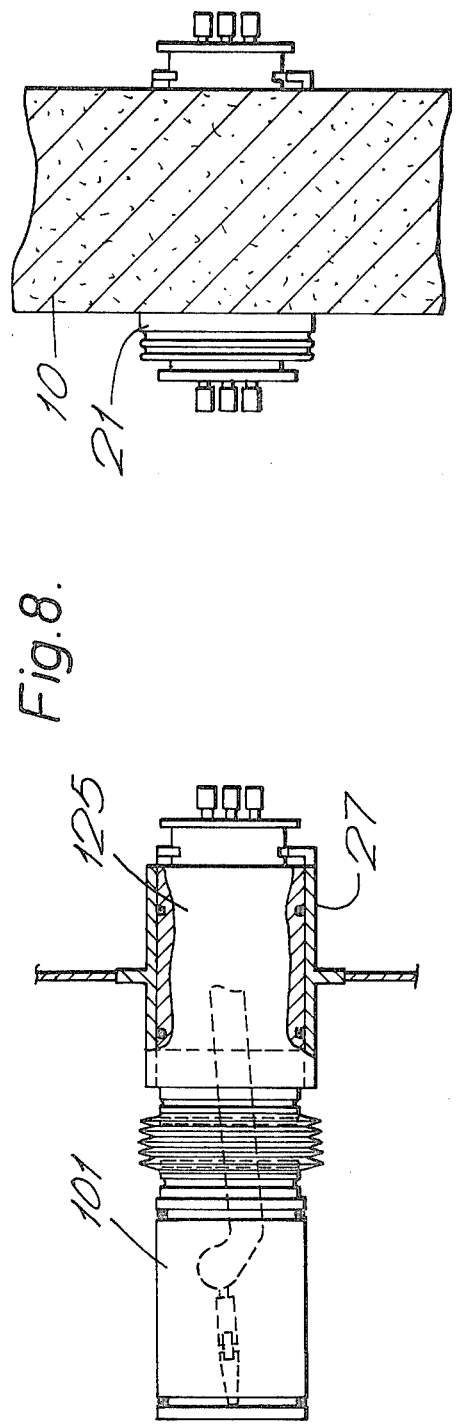

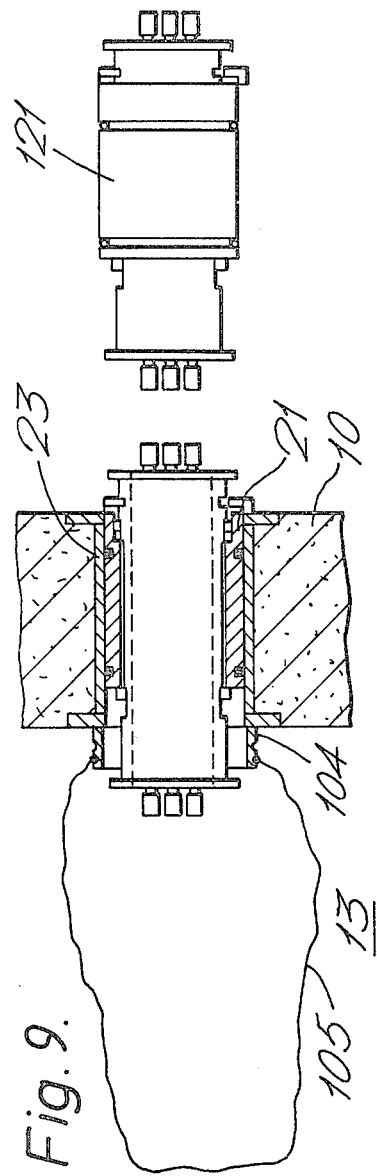
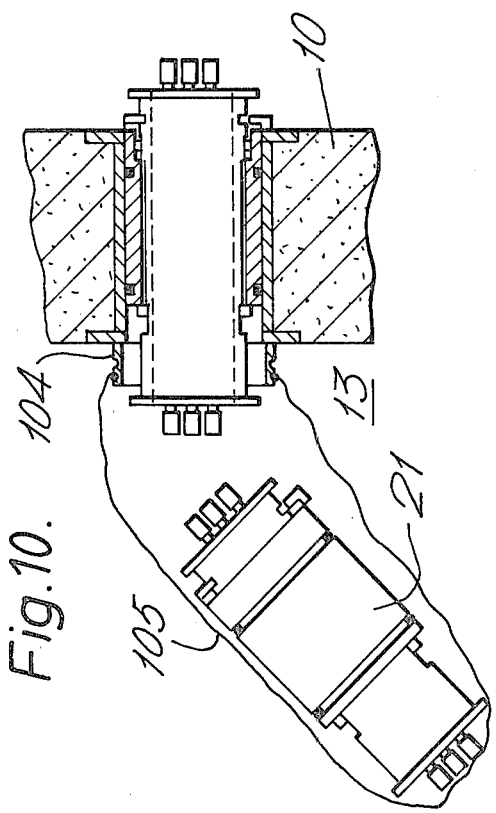

SHIELDED CELLS HAVING MANIPULATORS COMPRISING A MASTER ARM AND A SLAVE ARM

BACKGROUND OF THE INVENTION

This invention relates to shielded cells having manipulators comprising a master arm and a slave arm with a linking part between the arms.

Such cells are frequently used for handling alpha-emitting materials such as plutonium. As alpha contamination risks can arise from airborne substances any shielded cell therefore is expected to have a high standard of containment of such airborne substances at all times. In the past, alpha-emitting materials have been handled in a compartment (sometimes called a "glove box").

The master-slave manipulator is sealed in the glove box and the slave arm is encased in a sealing gaiter which extends from the shoulder to the wrist. For removal of the slave arm for servicing or replacement a complicated procedure of introducing the slave arm into protective bags is adopted and, whilst this is intended to maintain a high standard of containment, possibilities arise that slight airborne contamination can reach operator occupied regions. For current limitations on alpha contamination this known procedure is quite adequate but for a much reduced limit on alpha contamination (eg 1% of the currently accepted maximum permissible limit) improved methods of removing slave arms are required. The present invention provides such improved methods.

SUMMARY OF THE INVENTION

The present invention provides a shielded cell having a manipulator comprising a master arm and a slave arm sealed in the cell with a linking part between the arms characterised in that the linking part is demountable in a manner to permit the insertion of a replacement slave unit which can eject the existing slave arm into its contaminated environment without breaching the cell seal and then replace the existing slave arm, said replacement unit comprising a replacement slave arm preceded by an intermediate sealing body sealed with the replacement arm by a sealed flexible gaiter which is decouplable, also into said contaminated environment, once the seal of the replacement arm in the cell is set up.

The invention is further extended with advantage by providing the cell as a sealed compartment spaced from a shield wall to provide an interspace accessible to a protected operator and the linking part of the manipulator is demountable and spans from the shield wall to the sealed compartment and the replacement slave unit is insertable into the sealed compartment from the interspace when the linking part is demounted.

DESCRIPTION OF THE DRAWINGS

The invention will now be described further with reference to the accompanying drawings in which:

FIG. 5 is a diagrammatic representation of the disassembly procedure of the manipulator shown in FIG. 1.

FIGS. 6 to 8 are diagrams showing detail steps in the replacement of a manipulator slave arm;

FIGS. 9 and 10 show steps in the replacement of a manipulator master arm; and

DESCRIPTION OF THE PREFERRED EMBODIMENTS

Figure 1:
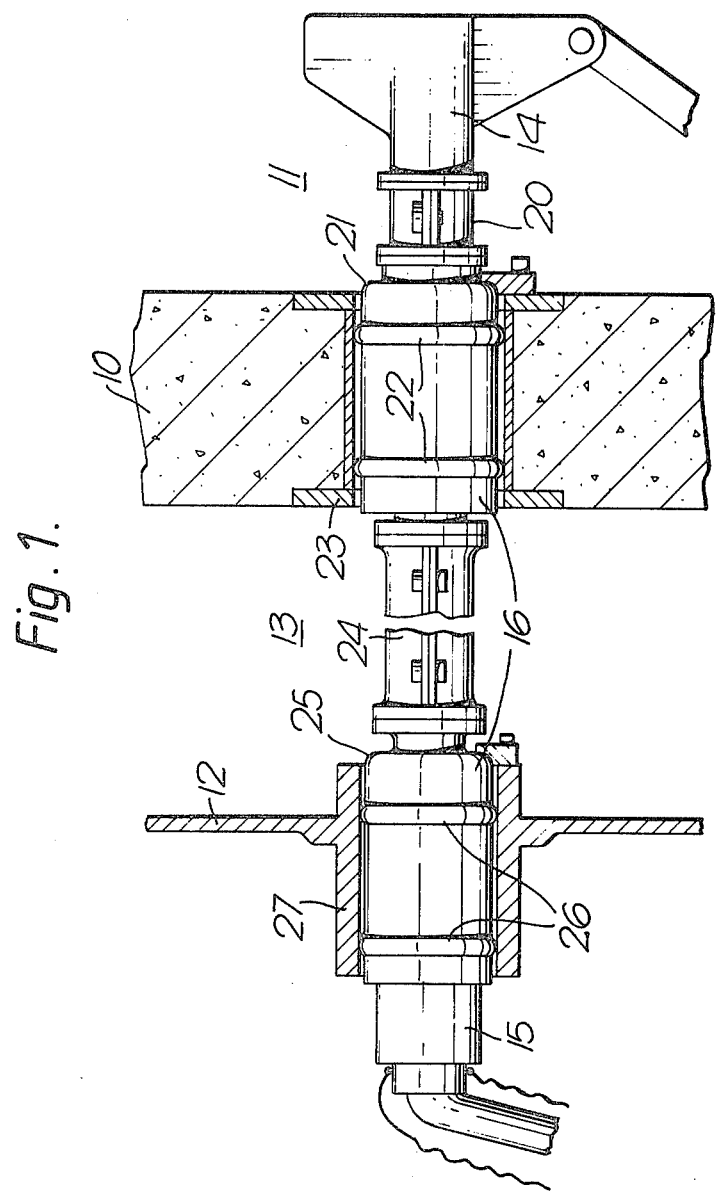
FIG. 1 is a side elevation, partly in section, of a master/slave manipulator installed in shielded cells according to the invention.

In FIG. 1 there is shown a shielded cell comprising a shield wall 10 permitting unprotected operator access in the region numbered 11 and a sealed compartment 12 spaced from the wall 10 by an interspace 13.

A master/slave manipulator is shown comprising a master arm 14, a slave arm 15 and a linking part 16 between the arms.

The part 16 has a number of sub-parts. These include a master arm support sleeve 21 sealed by sealing rings 22 in an aperture tube 23 in the wall 10, demountable coupling 24 and a slave arm support sleeve 25 sealed by rings 26 in an aperture tube 27 in the compartment 12. A further demountable coupling 20 is provided for the master arm.

The coupling 20 is accessible to a nominally unprotected operator in region 11 whilst the coupling 24, being between the wall 10 and compartment 12, is accessible to an operator in the interspace 13 having protective clothing.

Figure 2:
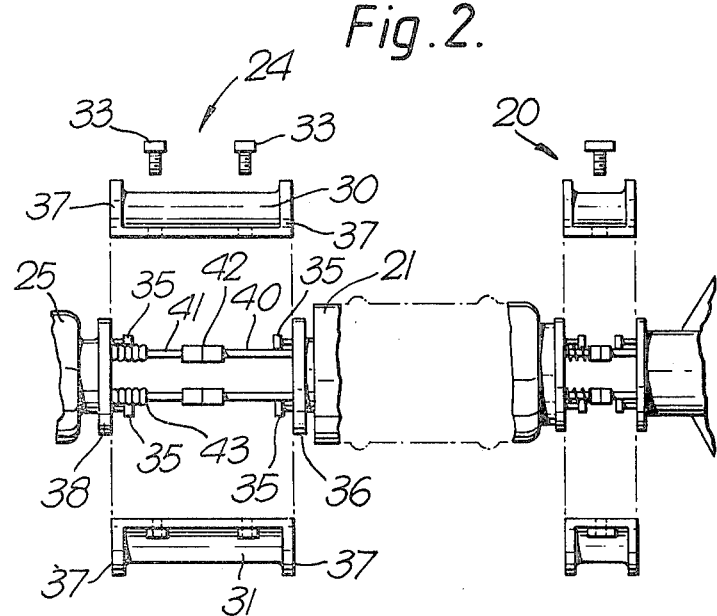
FIG. 2 shows an exploded view of the split sleeve parts of two decoupling means.
Figure 3:
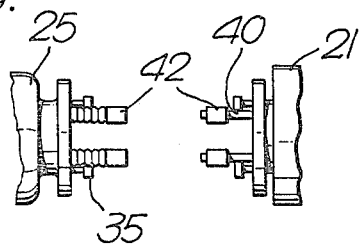
FIG. 3 shows an exploded view of one of the linear couplings of the manipulator.
Figure 4:
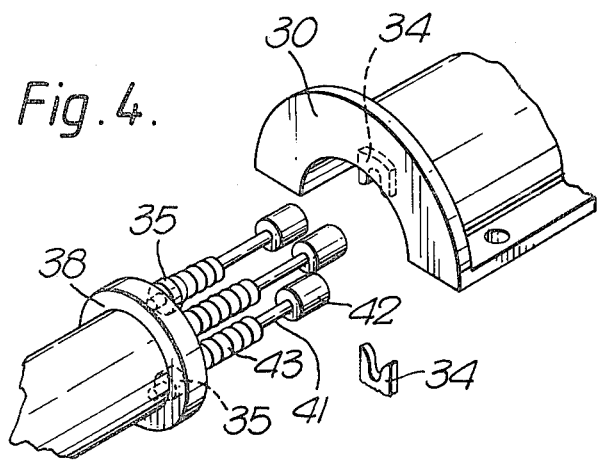
FIG. 4 is a fragmentary perspective view of a part of a coupling.

In FIG. 2 the couplings 20 and 24 are shown exploded and in more detail. The coupling 24 has a sleeve split into upper and lower parts 30, 31 which are normally secured together by bolts 33. Each part 30, 31 has a pair of slotted lugs 34 (FIG. 4) which engage on heads 35 so that rotary motion can be transmitted from a flange 36 to the flanges 37 on the parts 30, 31 and thence to a flange 38. On the removal of parts 30, 31, linear reciprocating parts 40, 41 joined by a coupling 42 are exposed. Parts 41 have bellows 43 to seal them in passage through flange 38. FIG. 3 shows the coupling 42 disconnected and the part 40, 41 moved apart. The coupling 20 is very similar in construction to that of coupling 24 and is not described in detail.

In FIG. 5 the master/slave manipulator is separated into its parts and the dis-assembly procedure is shown. Arrow 50 shows the direction of movement of the slave arm (represented by support sleeve 25) into the sealed compartment 12 whence it can be removed via an air lock. Arrow 51 shows the direction of movement of the master arm support sleeve 21 into the interspace where it is gathered by an operator using protective clothing. This operator has previously gathered the demounted coupling 24. The master arm 14 is removed by the nominally unprotected operator together with the demounted coupling 20.

Replacement of the "old" slave arm with a "new" arm is through the tube 23 in the direction of arrow 51, through the interspace 13, and then through the tube 27 in the direction of arrow 50. Couplings 24 and 20 can then be assembled.

The split sleeve form of coupling 24 is not essential and other couplings capable of transmitting the required torque between flanges 36 and 38 could be provided. In FIG. 6 the situation is shown in which the master arm support sleeve 21 and slave arm support sleeve 25 of FIG. 1 remain in position but the coupling 24 has been removed and a replacement slave arm assembly 100 is arranged in the interspace 13 between the wall 10 and the compartment 12. The assembly 100 comprises a replacement slave arm support sleeve 125 having sealing rings 126 and carrying a slave arm 115. An intermediate sealing body in the form of a sleeve 101 is provided and this sleeve has external sealing rings 102 and is coupled to the support sleeve 125 by a flexible bag 103.

In FIG. 7, the sleeve 101 has been pushed into the tube 27 by a protected operator in the interspace 13 to displace the support sleeve 25 into the compartment 12. The bag 103 is extended and there has been no breach of the containment as either a sealing ring 26 or 102 maintains a seal and the bag isolates the interspace 13 from the interior of the compartment 12. Thereafter, and as shown in FIG. 8, the sleeve 125 is advanced into the tube 27 to displace, in turn, the sleeve 101 into the compartment. Again there is no breach of the containment as either a sealing ring 102 or 126 maintains, with the bag 103, a seal. The sleeve 101 and bag 103 can then be detached within the compartment 12 by heat cutting the bag where it joins the support sleeve 125 by devices within the compartment 12 operated through gloved ports.

The support sleeve 125 can then be connected to the support sleeve 21 by reconnecting the coupling 24.

As shown in FIGS. 9 and 10, the support sleeve 21 can also be replaced before connecting to the sleeve 125 by means of the coupling 24. A bagging ring 104 is mounted at the inner end of the tube 23 in the wall 10 and a plastics bag 105 is attached to the ring 104. The support sleeve 21 is pushed into the bag by a replacement support sleeve 121 from outside the shield wall 10 and the bag 105 ensures that there is no direct access between the interspace 13 and the outside of the shield wall 10. The bag 105 containing the support sleeve 21 is then removed from the bagging ring 104 and can be heat sealed before removal from the interspace. The replacement support sleeve 121 can be then joined to the replacement support sleeve 125 by the coupling 24. The coupling 20 and master arm 14 are replaced to allow operation of the "new" manipulator.

Items displaced into the compartment 12 can be allowed to remain as debris on the floor of the compartment or removed through ports, provided for that purpose, into shielded disposal containers.

Figure 11:
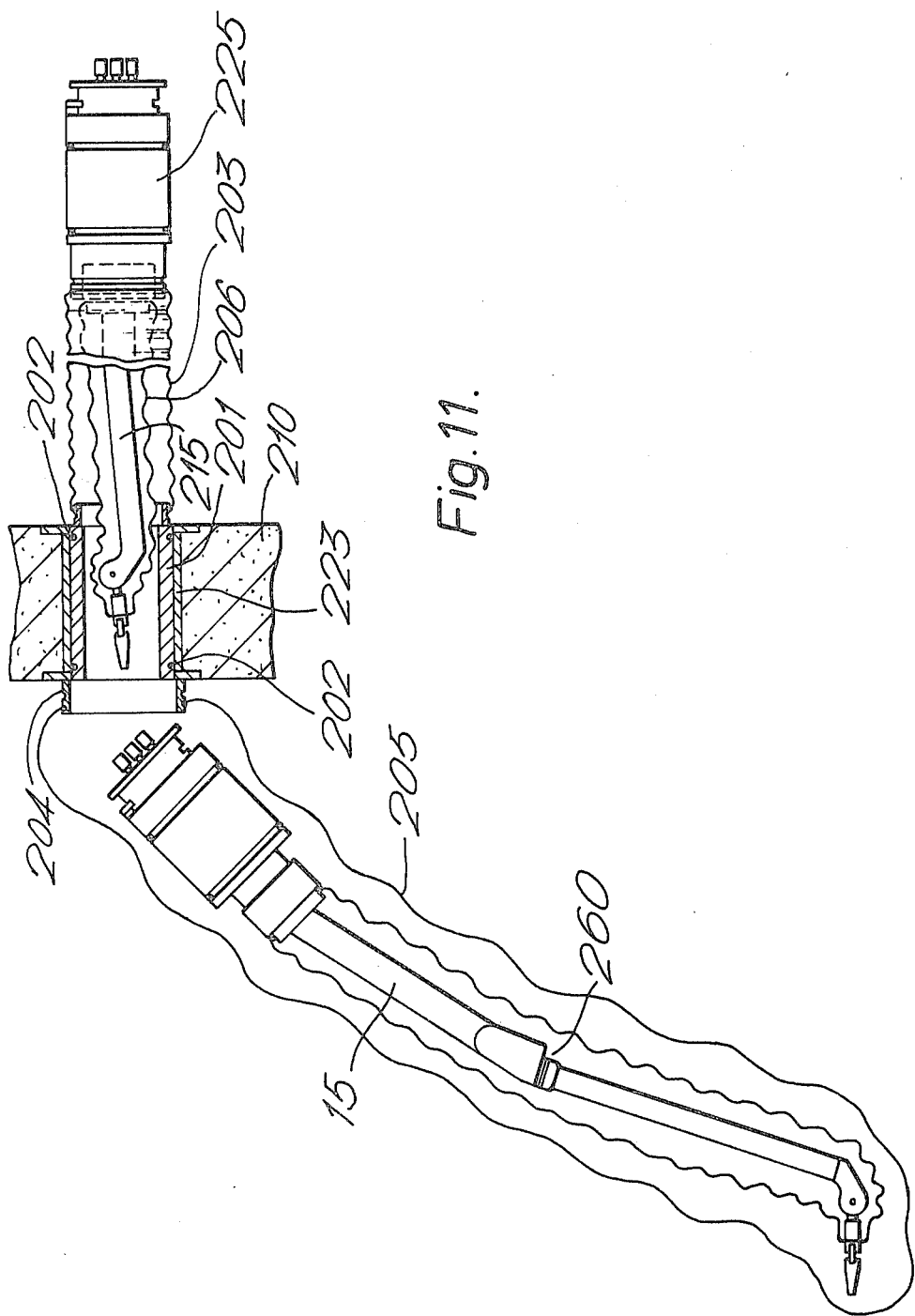
FIG. 11 shows a modified arrangement.

In FIG. 11 there is shown a modified arrangement which has been shown in the context of a shielded cell having a single shield wall 210 (which could also be wall 10 or 12). Aperture tube 223 in the wall 210 (or tube 27 in wall 12) is provided with bagging ring 204 on the side of the wall exposed to radiation. A bag 205 is attached to the ring 204 through gloves in glove posts to receive an "old" manipulator assembly 15 which is displaced by a "new" manipulator assembly 215. The "old" assembly is pushed out of the tube 223 by the end sleeve 201 which is coupled to the "new" support sleeve 225 by bag 203. The sleeve 201 is provided with sealing rings 202 which engage the tube 223. The bag containing the "old" manipulator can then be removed and sealed. The arm of the "new" manipulator is advanced through the tube 223 until the sleeve 225 abuts against the sleeve 201. At this position the bag 203 is compressed. Continued advance of the manipulator locates the sleeve 225 in the tube 223 and the sleeve 201 falls into the containment area. The bag 203 is then detached from the sleeve 225. The manipulator arm can be contained within a gaiter 206. A similar gaiter can also be provided about the slave arm in FIGS. 6 to 8.

A typical spacing between walls 10 and 12 of FIG. 1 is 1 meter. A typical manipulator slave arm may be about 1.5 to 2.0 meters. It is seen from FIG. 11 that the manipulator has an elbow 260 and, by bending the manipulator at the elbow, it is possible to manipulate it in the 1 meter space. Thus in FIG. 6 for example, although the replacement slave arm assembly 10 is shown for convenience in line with the aperture tube 27, in practice the assembly 100 can be bent initially and can be manipulated into its working position by a protected operator in the interspace 13.

We claim:

1. In apparatus comprising a shielded cell having a manipulator comprising a master arm and a slave arm sealed in the cell with a linking part between the arms, the improvement comprising means rendering the linkage part demountable in a manner to permit the insertion of a replacement slave unit, and an insertable replacement slave unit which, upon insertion, can eject the existing slave arm into its own contaminated environment without breaching the cell seal and then replace the existing slave arm, said replacement unit comprising a replacement seal for said cell, and a replacement slave arm preceded by an intermediate temporary sealing body sealed with the replacement arm by a sealed flexible and extensible gaiter which is decouplable, also into said contaminated environment, once said replacement seal of the replacement arm in the cell is moved into sealing position.

2. Apparatus as claimed in claim 1 in which the cell comprises a sealed compartment having a wall spaced from a shield wall to provide an interspace accessible to a protected operator, and the linking part is demountable and spans from the shield wall to the sealed compartment, and the replacement slave unit is insertable into the sealed compartment wall from said interspace when the linking part is demounted.

3. Apparatus as claimed in claim 2 in which the linkage part comprises a slave arm support sleeve sealed in an aperture tube in the compartment wall, a master arm support sleeve sealed in an aperture tube in the shield wall, and decoupling means allowing the slave arm to be released from the master arm.

4. Apparatus as claimed in claim 3 in which a further decoupling means is provided between the master arm and the linking part allowing the master arm to be decoupled from the linking part.

* * * * *